(12) United States Patent
Zarringhalam et al.

(10) Patent No.: US 11,858,509 B2
(45) Date of Patent: Jan. 2, 2024

(54) DRIVER OFFSET REQUEST FOR AUTOMATED LANE FOLLOWING

(71) Applicant: GM Global Technology Operations LLC, Detroit, MI (US)

(72) Inventors: Reza Zarringhalam, Oshawa (CA); Mohammadali Shahriari, Markham (CA); Wenhao Wu, Thornhill (CA); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 569 days.

(21) Appl. No.: 16/806,378

(22) Filed: Mar. 2, 2020

(65) Prior Publication Data

US 2021/0269025 A1    Sep. 2, 2021

(51) Int. Cl.
*B60W 30/12*    (2020.01)
*B60W 50/16*    (2020.01)
*B60W 30/16*    (2020.01)

(52) U.S. Cl.
CPC ............ *B60W 30/12* (2013.01); *B60W 30/16* (2013.01); *B60W 50/16* (2013.01)

(58) Field of Classification Search
CPC ....... B60W 30/12; B60W 30/16; B60W 50/16
See application file for complete search history.

(56) References Cited

U.S. PATENT DOCUMENTS

| | | | | |
|---|---|---|---|---|
| 5,875,408 | A * | 2/1999 | Bendett | G01S 17/10 356/3.01 |
| 7,363,140 | B2 * | 4/2008 | Ewerhart | B60W 30/143 701/96 |
| 8,219,298 | B2 * | 7/2012 | Nishira | B60W 50/0097 701/1 |
| 9,963,144 | B2 * | 5/2018 | Nakamura | G08G 1/166 |
| 10,013,882 | B2 * | 7/2018 | Fujii | G08G 1/167 |
| 2005/0256630 | A1 * | 11/2005 | Nishira | B60W 40/04 701/41 |
| 2008/0004807 | A1 * | 1/2008 | Kimura | B60W 40/02 701/301 |
| 2008/0061952 | A1 * | 3/2008 | Maass | B62D 15/025 340/435 |
| 2011/0187515 | A1 * | 8/2011 | Saito | B62D 15/0265 701/1 |
| 2016/0311464 | A1 * | 10/2016 | Yamaoka | B62D 15/0255 |
| 2017/0076606 | A1 * | 3/2017 | Gupta | B60K 35/00 |
| 2017/0334446 | A1 * | 11/2017 | Bosch | B60W 50/10 |
| 2018/0170389 | A1 * | 6/2018 | Ochida | B60W 40/04 |

(Continued)

*Primary Examiner* — Ramsey Refai
(74) *Attorney, Agent, or Firm* — Vivacqua Crane PLLC

(57) ABSTRACT

An operator offset request for automatic lane following system of an automobile vehicle includes an operator offset request defining a lateral offset distance away from a first travel-line of an automobile vehicle in a displacement path moved until a second travel-line of the automobile is achieved. An operator input setting system when actuated generates an initiation signal forwarded to a controller to input the operator offset request. An achievement signal is generated to signify a selected offset position selected by a vehicle operator for the offset distance is achieved. A vehicle return travel path is elected by the vehicle operator to return the automobile vehicle to the first travel-line from the second travel-line by a return displacement path which is opposite to the displacement path.

10 Claims, 7 Drawing Sheets

(56) References Cited

U.S. PATENT DOCUMENTS

| | | | | |
|---|---|---|---|---|
| 2018/0286242 | A1* | 10/2018 | Talamonti | B62D 15/025 |
| 2018/0345790 | A1* | 12/2018 | Mimura | B60W 50/16 |
| 2022/0204054 | A1* | 6/2022 | Taniguchi | B60W 30/12 |

* cited by examiner

DRIVER OFFSET REQUEST FOR AUTOMATED LANE FOLLOWING

INTRODUCTION

The present disclosure relates to automobile vehicle automated driving systems.

Automated driving systems for automobile vehicles normally attempt to direct the automobile vehicle to drive along a sensed and artificially created center of a roadway. During automated driving operation, different drivers, hereinafter operators have different perceptions of driving at the center of the roadway. In some driving scenarios the operators would prefer to have the automated driving system follow an intentional offset away from the center of the roadway and would seek to enter an offset request.

Current automated driving system offset functionally is limited to sensed side objects and does not cover cases perceived by the operator and missed by sensors. Known automated driving systems currently have no interface to acknowledge an operator's offset request. This lack of operator offset functionality may lead to operator discomfort with continuing operation with the automated driving feature and the operator potentially turning off the automated driving feature.

Thus, while current automobile vehicle automated driving systems achieve their intended purpose, there is a need for a new and improved system and method for an operator to request offsets from an automated lane being followed by an automated driving system.

SUMMARY

According to several aspects, an operator offset request for automatic lane following system of an automobile vehicle includes an operator offset request defining a lateral offset distance away from a first travel-line of an automobile vehicle in a displacement path until a second travel-line of the automobile is achieved. An operator input setting system when actuated generates an initiation signal forwarded to a controller to input the operator offset request. The operator input setting system also communicates a status of lane centering with offset to the operator through a human machine interface (HMI) communication.

In another aspect of the present disclosure, the system includes a steering wheel having a tactile sensor. The operator input setting system is actuated when a first hand of the operator contacts a first surface of the steering wheel using a tapping force on the first surface.

In another aspect of the present disclosure, an offset distance is achieved by a manual rotation of the steering wheel in a selected direction of offset driving after depression of the switch; a default center position of the steering wheel is returned to after achieving the offset distance; and a second actuation of the switch generates a second signal saving the offset distance.

In another aspect of the present disclosure, the tactile sensor defines one of a pressure sensor, a touch sensor and a capacitance sensor.

In another aspect of the present disclosure, the system further includes a steering wheel and a switch of the operator input setting system depressed by a vehicle operator to generate the initiation signal.

In another aspect of the present disclosure, an achievement signal is generated to signify an operator's selected offset position for the offset distance is achieved; a shift signal changes a current vehicle path or position to a selected path of travel; and an execution mode is performed to identify the automobile vehicle has laterally displaced away from the first travel-line by the first lateral offset distance in the displacement path until the second travel-line is achieved.

In another aspect of the present disclosure, a turn-signal arm is included in the operator input setting, the operator input setting system is actuated by displacing the turn-signal arm; and a processing controller area network (CAN) message is generated by displacing the turn-signal arm forwarded to the controller. The controller defines an on-board computer having hardware including a printed circuit board encoded with software directing operation of the automobile vehicle.

In another aspect of the present disclosure, a situation awareness defining a signal indicating no side threat on a side of the automobile vehicle is received; a notification is illuminated indicating to the operator an offset active condition is present; and an execution mode is performed to identify the automobile vehicle is laterally displacing away from the first travel-line in the displacement path until the second travel-line is reached.

In another aspect of the present disclosure, a second lateral offset distance is greater than the first lateral offset distance wherein when the second lateral offset distance is selected the automobile vehicle moves in a second displacement path until a third travel-line outward of the second travel-line is achieved.

In another aspect of the present disclosure, the first travel-line defines a projected roadway centerline.

In another aspect of the present disclosure, the HMI communication defines a light bar positioned on a steering wheel.

According to several aspects, an operator offset request for automatic lane following system of an automobile vehicle includes an operator offset request defining a lateral offset distance away from a first travel-line of an automobile vehicle in a displacement path moved until a second travel-line of the automobile is achieved. An operator input setting system when actuated generates an initiation signal forwarded to a controller to input the operator offset request. An achievement signal is generated to signify an offset position selected by a vehicle operator for the offset distance is achieved. A vehicle return travel path is elected by the vehicle operator to return the automobile vehicle to the first travel-line from the second travel-line by a return displacement path which is opposite to the displacement path.

In another aspect of the present disclosure, the operator input setting system includes: a steering wheel; and a first tactile sensor incorporated in the steering wheel, the first tactile sensor when contacted by the vehicle operator generating the initiation signal.

In another aspect of the present disclosure, a second tactile sensor is incorporated in the steering wheel, the first tactile sensor and the second tactile sensor when contacted by the vehicle operator generating a second signal to initiate the vehicle return travel path.

In another aspect of the present disclosure, the operator input setting system includes a turn-signal arm. The operator input setting system is actuated by displacing the turn-signal arm.

In another aspect of the present disclosure, the operator input setting system includes a switch depressed by the vehicle operator to generate the initiation signal.

In another aspect of the present disclosure, a human machine interface (HMI) communication is included wherein the operator input setting system also communicates a status of lane centering with offset to the operator through the human machine interface (HMI) communication.

According to several aspects, a method for applying operator offset requests for automatic lane following in an automobile vehicle includes: interfacing with a vehicle operator and receiving an operator selected distance offset for automated lane following; entering operator inputs into multiple activation zones; generating signals by tactile sensors in the activation zones contacted by the vehicle operator to forwarded to a determination block; performing in the determination block an operator offset determination step providing any one of four optional functions including a use maximum offset setting, a use operator controlled offset ramping setting, a use vehicle current offset setting and a reset to default setting; selecting an output from the determination block; forwarding the output to a mission planner; and generating an adjust lane offset modify signal according to the output selected by the vehicle operator in the determination block.

In another aspect of the present disclosure, the method further includes forwarding the adjust lane offset modify signal to a controller and generating a lateral control signal to move the automobile vehicle away from a first travel-line.

In another aspect of the present disclosure, the method further includes moving the automobile vehicle along one of a first displacement path defining a first displacement offset, a second displacement path defining a maximum displacement offset or a return displacement path returning the automobile vehicle to the first travel-line.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
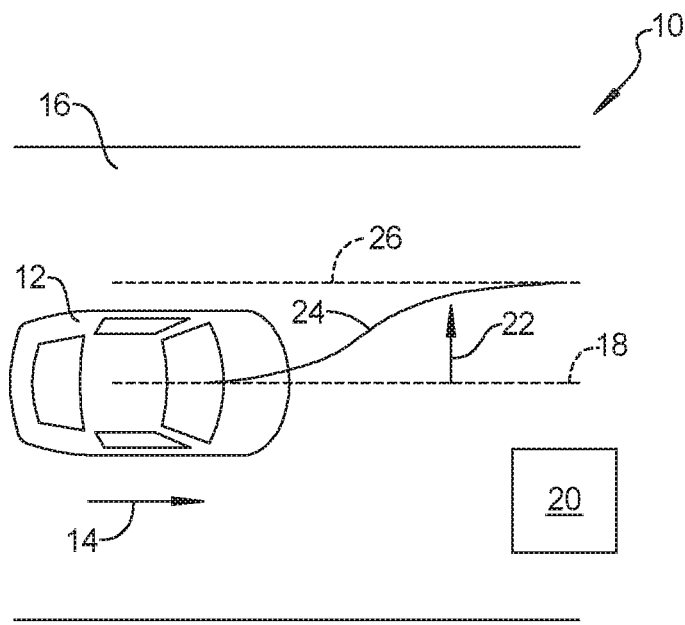
FIG. 1 is a top plan view of an automobile vehicle traversing a roadway employing an operator offset request for automatic lane following system according to an exemplary aspect.

Referring to FIG. 1, an operator offset request for automatic lane following system 10 and method for operation is provided in an automobile vehicle 12. The automobile vehicle 12 may be proceeding in a forward direction 14 on a roadway 16 under automated, "hand's free" driving operation using an automated driving control system. In an initial condition, the automobile vehicle 12 is traveling in the forward direction 14 while tracking an artificially generated or projected first travel-line 18 of the roadway 16 such as a roadway centerline. It is anticipated that the operator becomes aware of a first object 20 such as another vehicle, a wide-load trailer, a pedestrian, an obstruction, a pothole, a construction item such as a cone or sign, or the like and wishes to change a lateral position of the automobile vehicle 12 to avoid the first object 20.

Figure 5:
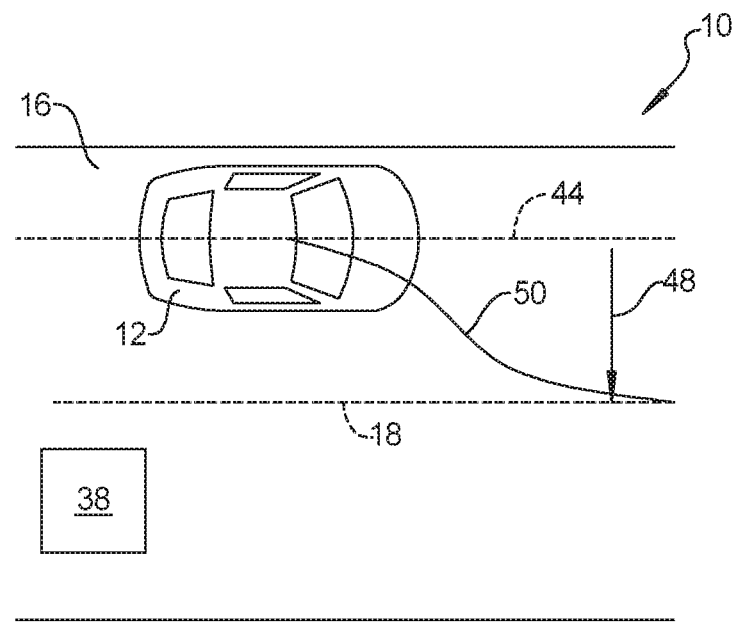
FIG. 5 is a top plan view modified from FIG. 3 further showing a vehicle return path from the maximum offset distance.

When actuated by the operator, if predetermined conditions are met the operator offset request for automatic lane following system 10 directs the automobile vehicle 12 to laterally displace away from the first travel-line 18 by a first lateral offset distance 22 moved by the automobile vehicle 12 in a first displacement path 24 until a new or second travel-line 26 is achieved which allows the automobile vehicle 12 to avoid the first object 20. It is noted the first lateral offset distance 22 moved by the automobile vehicle 12 in the first displacement path 24 is an exemplary displacement distance directed toward an operator left-hand side. It will be apparent an equal but opposite right-hand side displacement distance and motion are also available for the first lateral offset distance as well as a maximum offset distance described in reference to FIG. 5, as well as any selected offset distance between the first travel-line 18 and the maximum offset distance.

Figure 9:
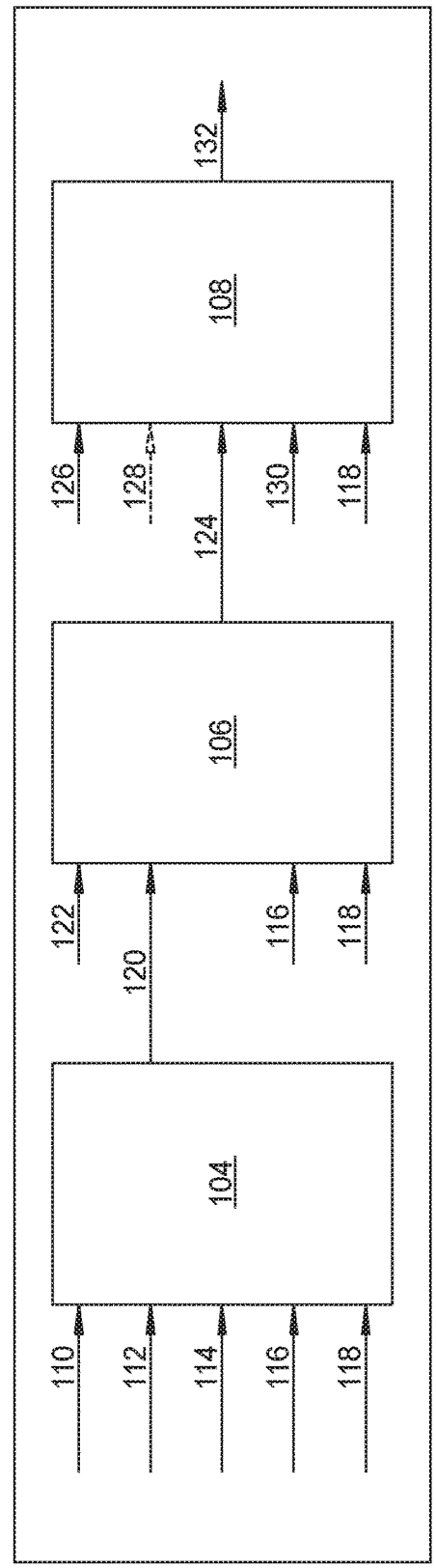
FIG. 9 is a diagrammatic presentation of a controller used in the system of FIG. 1.

Referring to FIG. 2 and again to FIG. 1, the operator may actuate the operator offset request for automatic lane following system 10 by one or more manual operations as follows. In a first example, an operator input setting system 27 is actuated when a left hand 28 of the operator contacts a left-side surface 30 of a steering wheel 32 using a pressure or tapping force 34 acting normal to or on the left-side surface 30. A force, pressure or capacitance exerted by the left hand 28 is sensed by a tactile sensor 36 such as a pressure sensor, a touch sensor, a capacitance sensor, or the like which is provided at the left-side surface 30. An initiation signal is generated by the tactile sensor 36 which is forwarded to a controller described in greater detail in reference to FIG. 9 to initiate the operator offset request.

Figure 2:
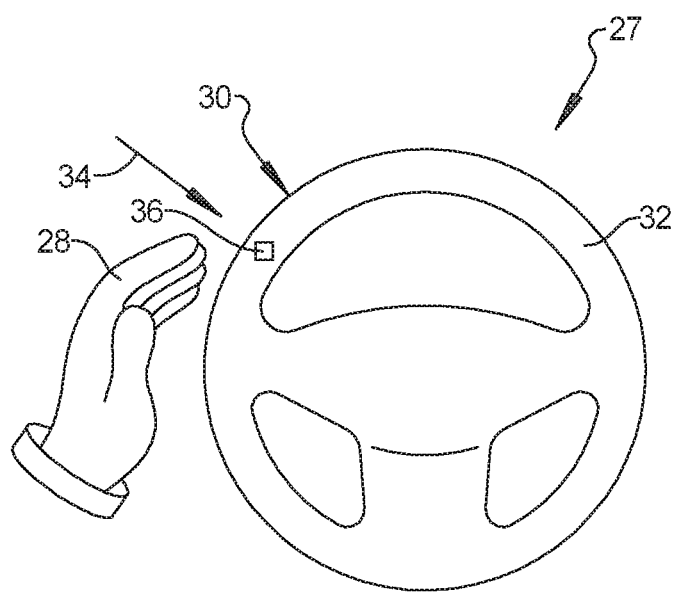
FIG. 2 is a rear elevational view looking forward of a vehicle steering wheel used in the system of FIG. 1.

Referring to FIG. 3 and again to FIGS. 1 and 2, if in the judgment of the operator the first lateral offset distance 22 may not avoid the first object 20, or if a second object 38 larger than the first object 20 is identified in the path of the automobile vehicle 12, the operator offset request for automatic lane following system 10 provides for a maximum second lateral offset distance 40 greater than the first lateral offset distance 22. If the second lateral offset distance 40 is selected, the automobile vehicle 12 moves in a second displacement path 42 until a new or third travel-line 44 outward of the second travel-line 26 is achieved which allows the automobile vehicle 12 to avoid the second object 38 while remaining within boundaries of the roadway 16.

Figure 3:
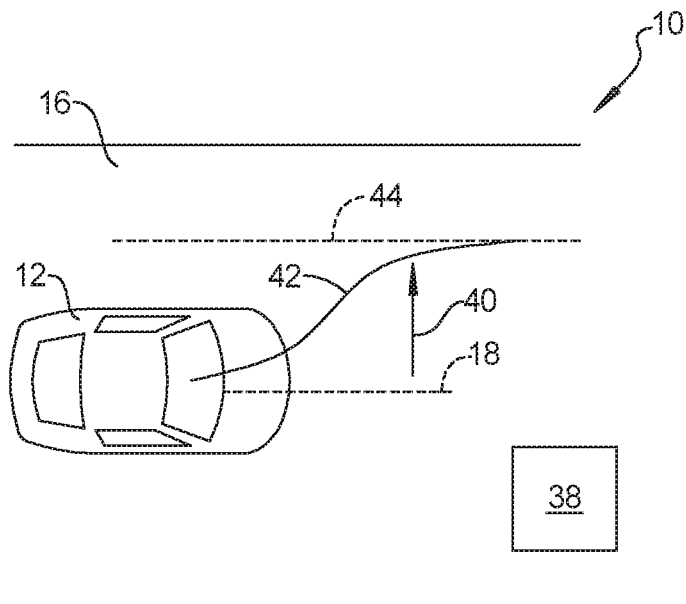
FIG. 3 is a top plan view similar to FIG. 1 further providing a maximum offset distance.
Figure 4:
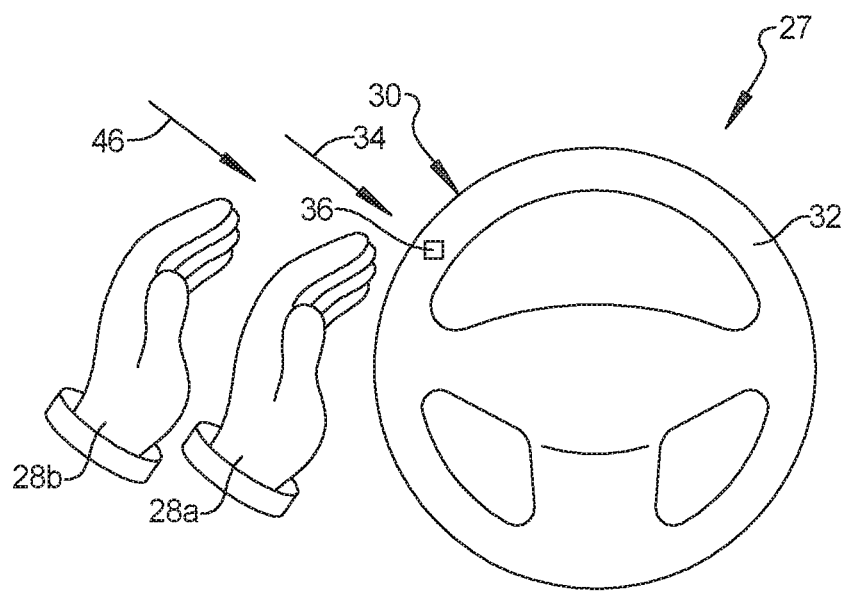
FIG. 4 is a rear elevational view similar to FIG. 1 modified to show a further operator command motion.
Figure 7:
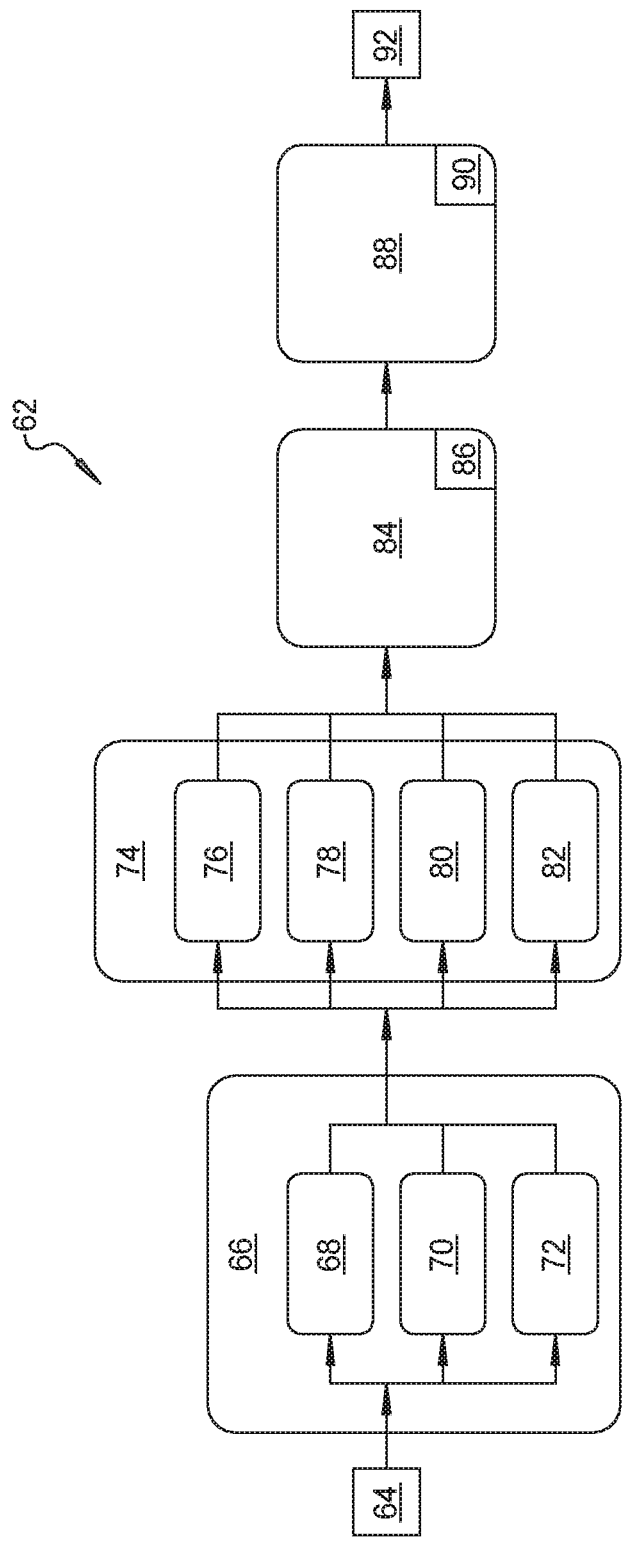
FIG. 7 is a diagrammatic presentation of the system of FIG. 1.

Referring to FIG. 4 and again to FIGS. 2 and 3, to select the maximum second lateral offset distance 40 the operator taps or presses twice on the left-side surface 30 of the steering wheel 30 as follows. The operator contacts the left-side surface 30 of the steering wheel 32 using the tapping or tapping force 34 of the operator's left hand designated 28a, acting normal to or on the left-side surface 30. The initiation signal identified above is generated by the tactile sensor 36 which is forwarded to the controller described in greater detail in reference to FIG. 7. The operator then repeats the contact with the left-side surface 30 of the steering wheel 32 using a second pressure or second tapping force 46 of the operator's left hand designated 28b, which may act normal to or on the left-side surface 30. The time interval between the first contact and the second contact with the steering wheel 32 can vary and can range from approximately 0.1 ms up to approximately 1 second, which is a predetermined time interval range. The second contact generates a second initiation signal by the tactile sensor 36 which is also forwarded to the controller described in greater detail in reference to FIGS. 7 and 9. The second contact occurring within the predetermined time interval range of the first contact initiates the operator maximum offset request signal.

Referring to FIG. 5 and again to FIGS. 1 through 4, the operator offset request for automatic lane following system 10 provides for the vehicle travel path to be returned to the first travel-line 18 from either the third travel-line 44 shown or from the second travel-line 26 shown in reference to FIG. 1. In the example shown in FIG. 5 return travel is by a third lateral offset distance 48 which is opposite to the maximum second lateral offset distance 40. Return travel is via a third displacement path 50 which is opposite to the second displacement path 42.

Figure 6:
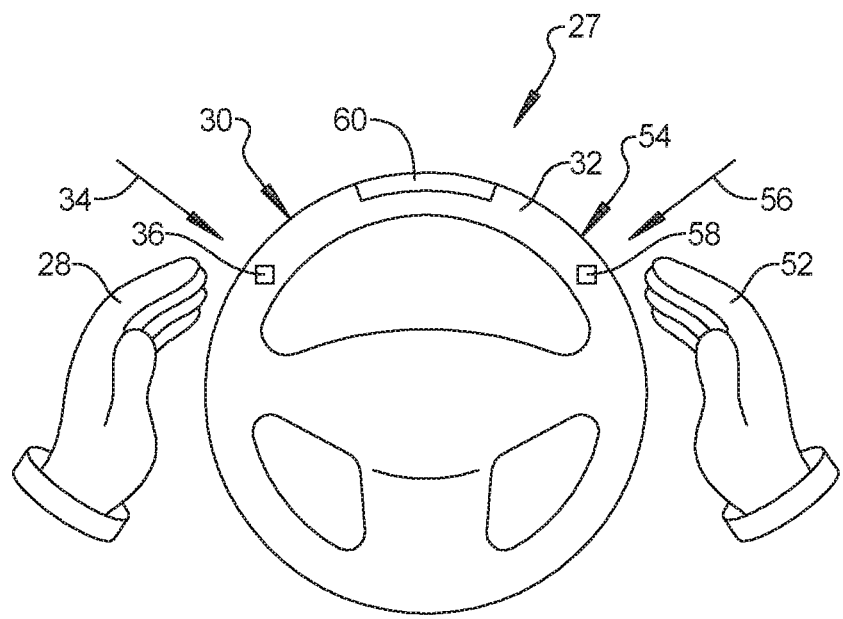
FIG. 6 is a rear elevational view similar to FIG. 1 modified to show a further operator command motion.

Referring to FIG. 6 and again to FIGS. 1 through 5, the following procedure may be used to return the vehicle travel path to the first travel-line 18 from either the third travel-line 44 shown or from the second travel-line 26 shown in reference to FIG. 1. The operator taps the steering wheel 32 using the operator's left hand 28 and a right hand 52 of the operator at approximately the same time, or within a predetermined time interval. The tapping force 34 is thereby applied to the left-side surface 30 contacting the tactile sensor 36, and the right hand 52 contacts a right-side surface 54 of the steering wheel 32 using a tapping force 56 which may be equal to the tapping force 34. The right-hand contact is sensed by a second tactile sensor 58 of the steering wheel 32, similar to the tapping force sensed by the tactile sensor 36. The steering wheel 32 may also include a light bar 60 which illuminates to visually indicate a variety of operator information, including during operation of the operator offset request for automatic lane following system 10.

Referring to FIG. 7 and again to FIGS. 1 through 6, the operator offset request for automatic lane following system 10 includes a method 62 to interface with an automobile vehicle operator and receive operator selected offset instructions to automatically follow the roadway 16. The method includes entering operator inputs 64 into multiple activation zones 66. The activation zones 66 include at least a first touch-sensing zone 68 defined as a forward-facing side of the steering wheel 32 furthest from the operator and closest to a front of the automobile vehicle 12. The activation zones 66 also include at least a second touch-sensing zone 70 defined as the left-side surface 30 which includes a rear or operator-facing side of the steering wheel 32 ranging clockwise from a 6 o'clock position up to the light bar 60 on the steering wheel 32 facing opposite to the first touch-sensing zone 68 and furthest from the front of the automobile vehicle 12. The activation zones 66 also include at least a third touch-sensing zone 72 defined as the right-side surface 54 which includes a rear or operator-facing side of the steering wheel 32 ranging counterclockwise from a 6 o'clock position up to the light bar 60 on the steering wheel 32 and furthest from the front of the automobile vehicle 12. According to several aspects, the first touch-sensing zone 68, the second touch-sensing zone 70 and the third touch-sensing zone 72 may include a touch or tactile sensor such as the tactile sensor 36 and the second tactile sensor 58 previously described in reference to FIGS. 2 and 6.

Signals generated by any of the tactile sensors of the first touch-sensing zone 68, the second touch-sensing zone 70 and the third touch-sensing zone 72 are forwarded to a determination block 74 for performance of an operator offset determination step which provides any one of four optional functions including a use maximum offset setting 76, a use operator controlled offset ramping setting 78, a use vehicle current offset setting 80 and a reset to default setting 82.

Output from the determination block 74 as selected by the operator in the operator offset determination block 74 is forwarded to a mission planner 84. An adjust lane offset modify signal 86 is generated by the mission planner 84 according to the selection made by the operator in the determination block 74.

The adjust lane offset modify signal 86 is forwarded to a unified lateral controller 88 which generates a lateral control signal 90 appropriate to perform one of the first displacement path 24, the second displacement path 42 or the third displacement path 50 maneuvers.

The lateral control signal 90 varies to generate a lane following torque command 92 to complete the transition of the automobile vehicle 12 to one of the second travel-line 26, the third travel-line 44 or to return to the first travel-line 18.

Figure 8:
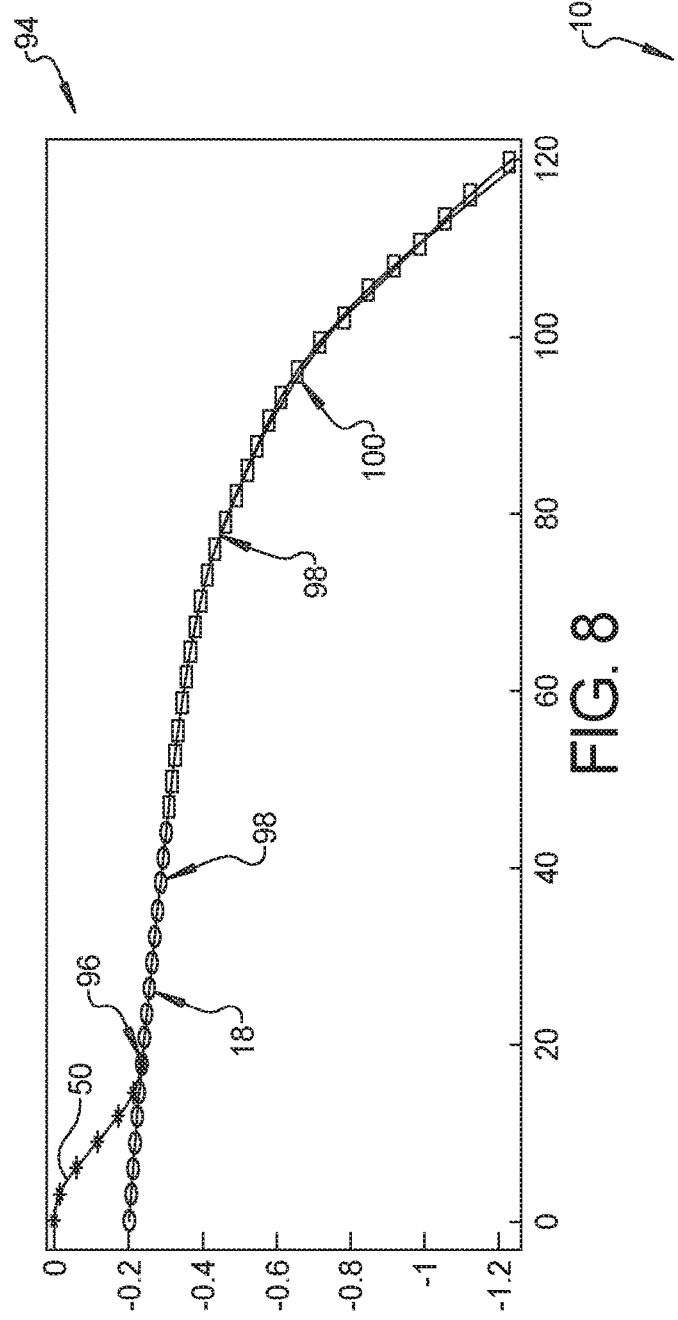
FIG. 8 is a graph presenting an exemplary travel path of an automobile vehicle using the system of FIG. 1.

Referring to FIG. 8 and again to FIGS. 1 through 7, a graph 94 identifies an exemplary travel path of the automobile vehicle 12 including the third displacement path 50 blended at a merge location 96 with the original projected first travel-line 18 of the roadway 16 defining a blue line data path. The first travel-line 18 is extended using a target path 98 generated to blend into an extending map path 100 available for example using map data or global positioning system (GPS) data.

Referring to FIG. 9 and again to FIGS. 1 through 8, a controller 102 operating the operator offset request for automatic lane following system 10 includes a position and heading control unit 104 which communicates with a curvature control unit 106. The curvature control unit 106 communicates with a steering angle and torque control unit 108. The position and heading control unit 104 receives a vehicle position signal 110, a vehicle heading 112, and a vehicle path curvature 114, and incorporates these with predetermined safety constraints 116 and a vehicle speed and path signal 118 to generate a curvature command signal 120 which is communicated to the curvature control unit 106.

The curvature control unit 106 receives the curvature command signal 120 as well as a measured vehicle curvature signal 122. The curvature control unit 106 incorporates these signals with the predetermined safety constraints 116 and the vehicle speed and path signal 118 to generate a steering angle command signal 124.

The steering angle and torque control unit 108 receives the steering angle command signal 124 as well as a steering angle and rate signal 126 and an operator applied torque signal 128. The steering angle and torque control unit 108 incorporates these signals with the vehicle speed and path signal 118 and a safety and feel constraints signal 130 to generate a steering torque command signal 132.

Figure 10:
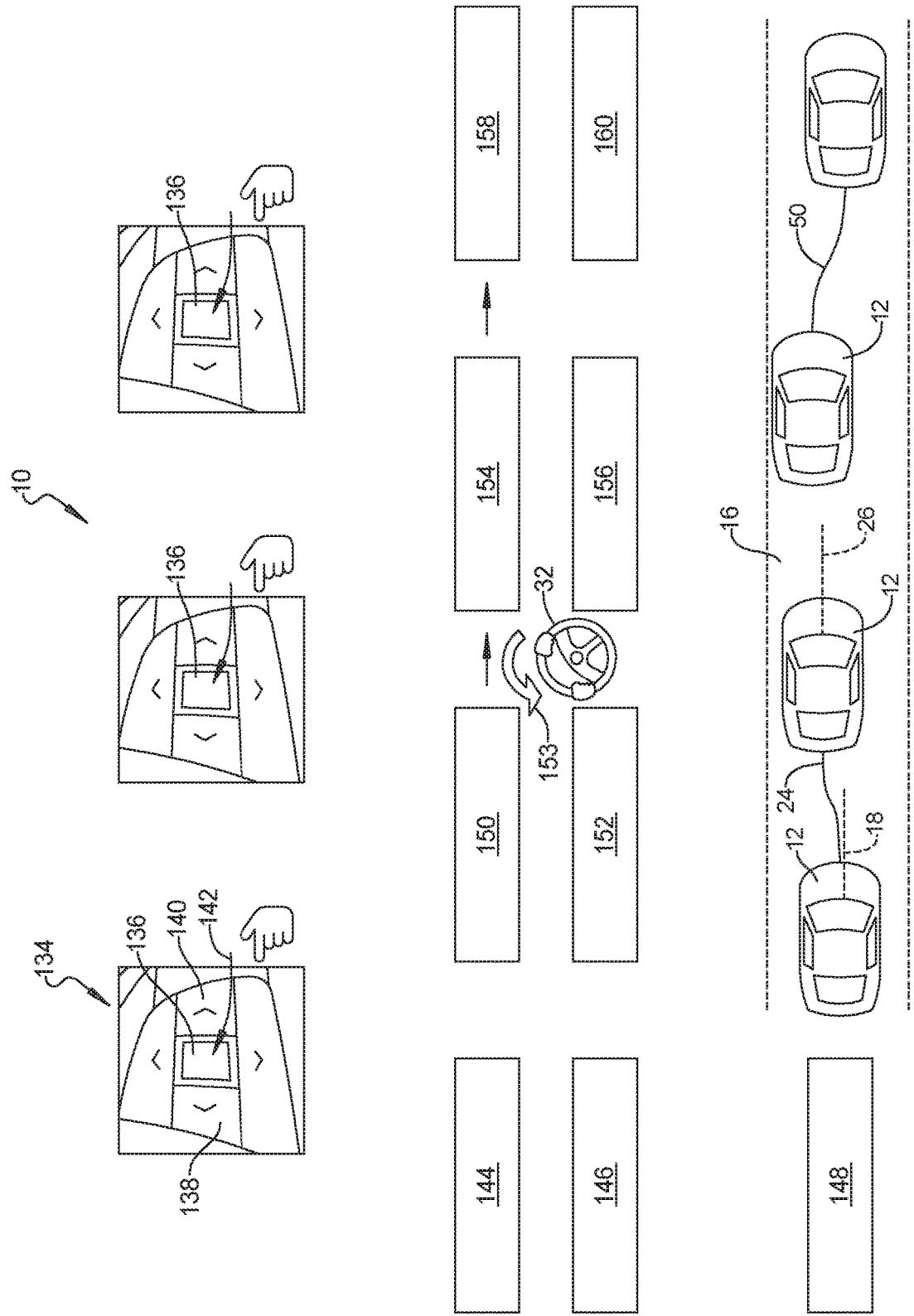
FIG. 10 is a diagrammatic presentation of an alternate aspect for controlling operation of the system of FIG. 1.

Referring to FIG. 10 and again to FIGS. 1 through 9, according to further aspects the operator offset request for automatic lane following system 10 can be initiated by actuation of an operator input setting system 134 which includes at least one and according to several aspects multiple switches selectively depressed by the vehicle operator in lieu of tactile sensors. The switches of the operator input setting system 134 may include an actuation switch 136, a first directional selection switch 138 actuated for example to select a left-hand vehicle position change, and a second directional selection switch 140 actuated for example to select a right-hand vehicle position change. According to several aspects, the operator may also initiate the operator input setting system 134 by pressing the actuation switch 136 followed by manual rotation of the steering wheel 32 to direct the automobile vehicle 12 in an operator selected direction. According to several aspects, the operator input setting system 134 may be located on an operator facing surface of the steering wheel 32 or may be positioned on a dashboard surface of the automobile vehicle.

Upon receipt of an operator's input command, one of multiple command interpretations 144 are conducted. This is followed by system election of one of multiple control modes 146. One of multiple execution modes 148 is then performed.

In an exemplary operation, the operator initiates the operator input setting system 134 by pressing the actuation switch 136 a single time. The command interpretation 144 of the initial pressing of the actuation switch 136 is an allowance 150 for the operator to set the off-set distance. In the control mode 146 for this command an allowance signal 152 of operator control is generated which may be limited to apply control torque to override the request if a lane crossing is deemed to be imminent.

The operator then manually rotates the steering wheel 32 in a selected direction of offset driving, for example in a counterclockwise direction 153 shown. When the operator selected offset distance is achieved, the steering wheel 32 is returned to the default center position and the operator again presses the actuation switch 136 a single time. The command interpretation 144 of this action is generation of an achievement signal 154 signifying the operator's selected offset position for a left-hand offset distance is achieved. The result in the control mode 146 for this command is generation of a shift signal 156 to change the current vehicle path or position to the selected path of travel. One of the execution modes 148 is then performed for example to identify the automobile vehicle 12 has laterally displaced away from the first travel-line 18 by the first lateral offset distance 22 in the first displacement path 24 until the new or second travel-line 26 is now achieved.

If the operator wishes to cancel offset driving and return to the first travel-line 18, the operator depresses the actuation switch 136 twice. The command interpretation 144 of double-pressing the actuation switch 136 is the operator is requesting a return offset 158 to the default first travel-line 18 travel path. The election made in the control mode 146 for this command is an application command signal 160 to apply assist torque. One of the execution modes 148 is then performed for example to direct the automobile vehicle 12 to laterally displace away from the second travel-line 26 by a lateral offset distance to move the automobile vehicle 12 in the exemplary third displacement path 50 until the first travel-line 18 travel path is achieved.

Figure 11:
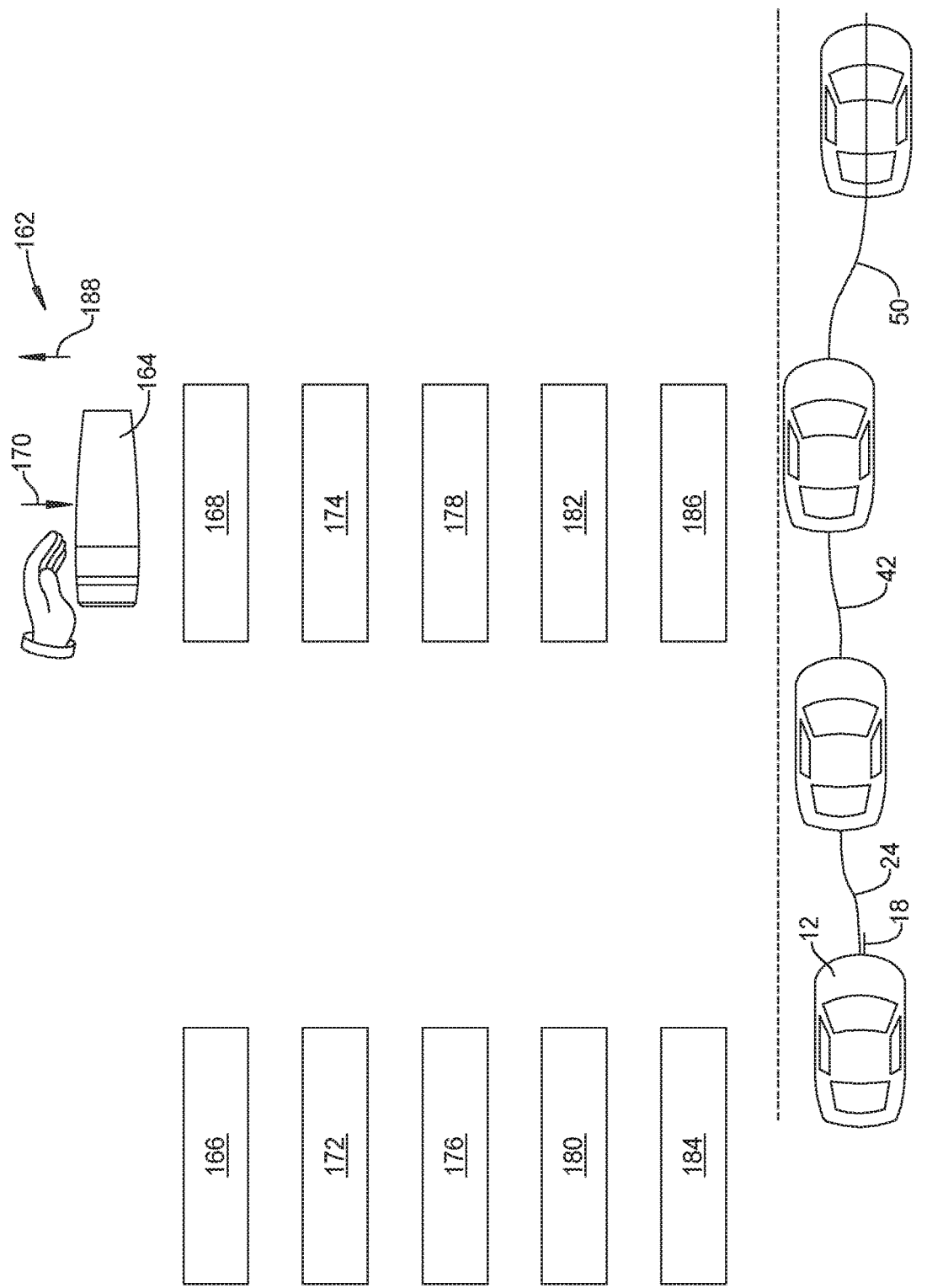
FIG. 11 is a diagrammatic presentation of another alternate aspect for controlling operation of the system of FIG. 1.

Referring to FIG. 11 and again to FIGS. 1 through 10, according to other aspects, in addition to the operator input setting system 27 and the operator input setting system 134, according to further aspects the operator offset request for automatic lane following system 10 can be initiated by actuation of an operator input setting system 162 which may use displacement of a turn-signal arm 164 to generate signals indicating the operator's selection of an offset distance.

In an exemplary operation of the turn-signal arm 164, in an input operation 166 the operator initiates the operator input setting system 134 by a tapping input 168 displacing the turn-signal arm 164 for example in a downward direction 170. In an input processing step 172 a processing controller area network (CAN) message 174 is forwarded to the controller 102, defining an on-board computer having hardware such as a printed circuit board encoded with software directing the automobile vehicle 12 how to operate. A command interpretation 176 of the initial pressing of the actuation switch 136 is an offset command 178 to set an offset distance, for example a vehicle left-hand offset distance.

A situation awareness 180 is requested, for example a signal 182 indicating no side threat on the left side of the automobile vehicle 12 is received. If the situation awareness 180 indicates the automobile vehicle 12 can move to the left, a notification of an offset left active condition 186 being present is illuminated. One of multiple execution modes 184 similar to the execution modes 148 is then performed for example to identify the automobile vehicle 12 is laterally displacing away from the first travel-line 18 in the first displacement path 24 until the new or second travel-line 26 is reached.

If the operator wishes to cancel offset driving and return to the first travel-line 18, the operator depresses the turn-signal arm 164 twice in an upward direction 188 opposite to the downward direction 170. The command interpretation of double-pressing the turn-signal arm 164 twice is a return offset command for return to the default first travel-line 18 travel path. The election made in the control mode 146 for this command is an application command to apply assist torque. One of the execution modes 184 is then performed for example to direct the automobile vehicle 12 to laterally displace away from the second travel-line 26 by a lateral offset distance to move the automobile vehicle 12 in the third displacement path 50 until the first travel-line 18 travel path is achieved.

The operator input setting systems 27, 134, 162 of the operator offset request for automatic lane following system 10 temporarily save and hold an operator identified or selected offset distance while automated lane centering features are controlling. The operator input setting systems also adjust the offset distance in response to operator demands while automatic lane centering features are controlling. The operator input setting systems also propagate the selected offset distance to the controller of the control system and further communicate the status of lane centering with offset to the operator through human machine interface (HMI) communications.

An operator offset request for automatic lane following system 10 and method for operation of the present disclosure offers several advantages. These include provision of an intuitive interface allowing a vehicle operator to set and reset a vehicle offset for automated driving applications. An algorithm processes the operator inputs and allows an asymptotically infinite number of offsets within operational constraints. The present system and method provides an interface with the operator through steering wheel touch, manual switches, turn-signal arm and other mechanisms to receive the operator's requested offset for automated driving. The present system and method interprets, executes and communicates the intentional offset and communicates the status of the operator requested offset functionality through human-machine-interface notifications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automatic lane following system of a vehicle, comprising:
    a controller programmed to have an operator offset request defining a lateral offset distance away from a first travel-line of the vehicle in a first displacement path until a second travel-line of the vehicle is achieved, wherein the lateral offset distance is bounded by a lane in which the vehicle is traveling, and the second travel-line is within the same lane as the first travel-line;
    a steering wheel;
    an operator input setting system when actuated generating an initiation signal forwarded to the controller to input the operator offset request, a switch of the operator input setting system depressed by a vehicle operator to generate the initiation signal;
    the operator input setting system communicating a status of lane centering with offset to the operator through a human machine interface (HMI) communication;
    the offset distance achieved by a manual rotation of the steering wheel in a selected direction of offset driving after depression of the switch;
    a default center position of the steering wheel returned to after achieving the offset distance; and
    a second actuation of the switch generating a second signal saving the offset distance.

2. The automatic lane following system of claim 1, further including:
    an achievement signal generated to signify an operator's selected offset position for the offset distance is achieved;
    a shift signal changing a current vehicle path to a selected path of travel; and
    the controller programmed to have an execution mode performed to identify the automobile vehicle has laterally displaced away from the first travel-line of the automobile vehicle by the first lateral offset distance in the displacement path until the second travel-line is achieved.

3. The automatic lane following system of claim 1, further including:
    a turn-signal arm included in the operator input setting, the operator input setting system actuated by displacing the turn-signal arm; and
    a processing controller area network (CAN) message generated by displacing the turn-signal arm forwarded to the controller, the controller defining an on-board computer having hardware including a printed circuit board encoded with software directing operation of the automobile vehicle.

4. The automatic lane following system of claim 3, further including:
    the controller programmed to have a situation awareness defining a signal indicating no side threat on a side of the automobile vehicle is received;
    a notification illuminated indicating to the operator an offset left active condition is present; and
    the controller programmed to have an execution mode performed to identify the automobile vehicle is laterally displacing away from the first travel-line in the displacement path until the second travel-line is reached.

5. The automatic lane following system of claim 1, wherein the operator offset request further defines a second offset distance greater than the first offset distance, wherein when the second offset distance is selected by the operator the automobile vehicle moves in a second displacement path until a third travel-line outward of the second travel-line is achieved.

6. The automatic lane following system of claim 1, wherein the first travel-line defines a projected roadway centerline.

7. The automatic lane following system of claim 1, further comprising:
    an achievement signal generated to signify a selected offset position of a vehicle operator for the offset distance is achieved; and
    a vehicle return travel path elected by the vehicle operator to return the automobile vehicle to the first travel-line from the second travel-line by a return displacement path which is opposite to the displacement path.

8. The automatic lane following system of claim 7, wherein the operator input setting system includes a turn-signal arm, the operator input setting system actuated by displacing the turn-signal arm.

9. The automatic lane following system of claim 7, wherein the operator input setting system includes a switch depressed by the vehicle operator to generate the initiation signal.

10. The automatic lane following system of claim 7, further including a human machine interface (HMI) communication wherein the operator input setting system also communicates a status of lane centering with offset to the operator through the human machine interface (HMI) communication.

* * * * *